Feb. 27, 1945.   J. M. SCHUCKERS   2,370,199
CLUTCH
Filed Feb. 26, 1942

INVENTOR.
John M. Schuckers
BY
Duell, Kane and Smoot
ATTORNEYS

Patented Feb. 27, 1945

2,370,199

UNITED STATES PATENT OFFICE 2,370,199

CLUTCH

John M. Schuckers, Elmira, N. Y., assignor to The Hilliard Corporation, Elmira, N. Y., a corporation of New York Application February 26, 1942, Serial No. 432,397

12 Claims. (Cl. 192—105)

This invention relates to a structurally and functionally improved clutch or coupling especially intended to connect driving and driven members or shafts and so that the driven element will be rotated by the driving element as the speed of the latter increases and dependent only upon the load imposed and resultant resistance to movement of the driven element.

In its more specific aspects, it is an object of the invention to furnish a unit of this type and which will function automatically and in response to the action of centrifugal force; the torque transmitted to the driven member of the unit increasing in proportion to the speed of the driving member.

A further object of the invention is that of designing a clutch which will embody relatively few parts, each individually simple and rugged in construction; these parts being capable of ready assemblage and adjustment and operating over long periods of time with freedom from all difficulties.

An adidtional object is that of providing a clutch in which the parts may be so designed and correlated that, dependent upon an accelerated movement of the driving member or shaft and also dependent upon the resistance to movement of the driven member or shaft, the clutch will serve to evenly and desirably accelerate the movement of the driven member.

With these and other objects in mind, reference is had to the attached sheet of drawings, illustrating practical embodiments of the invention, and in which.

Figure 1:
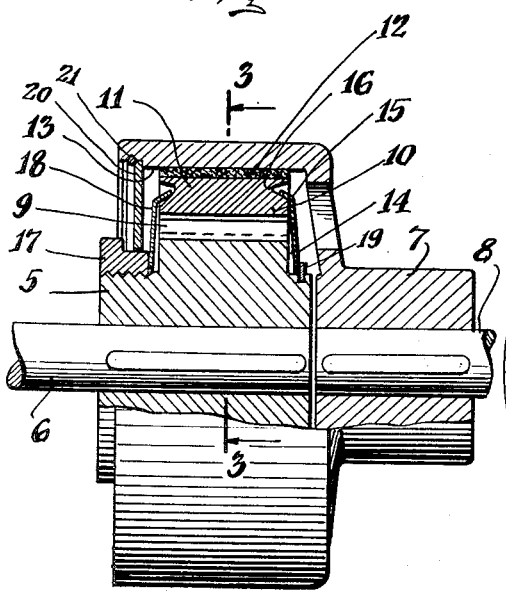
Fig. 1 is a fragmentary transverse sectional view taken through the clutch.
Figure 2:
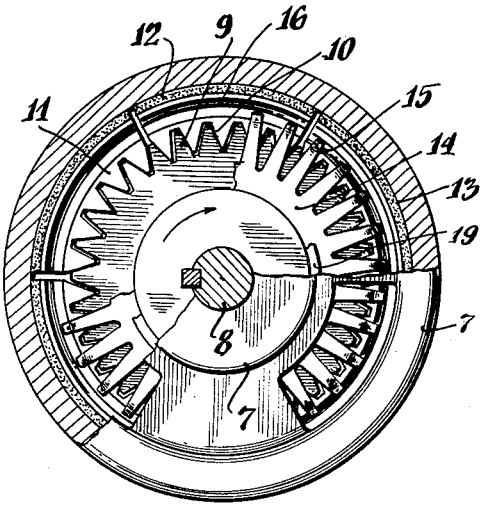
Fig. 2 is a partly sectional end view thereof, with certain of the parts broken away to disclose underlying constructions.
Figure 3:
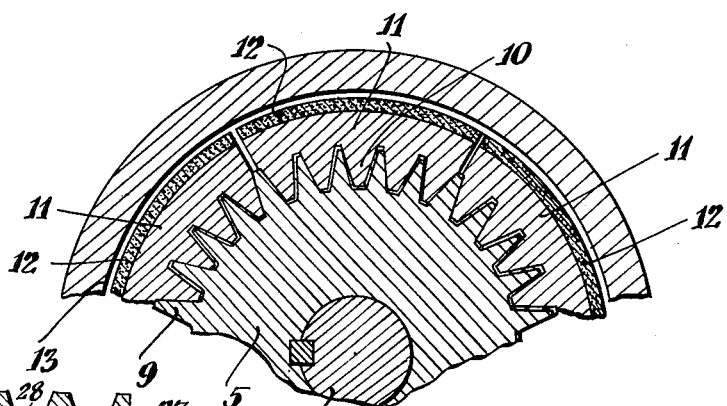
Fig. 3 is an enlarged sectional view of a fragment of the clutch and taken along the lines 3—3 and in the direction of the arrows as indicated in Fig. 1.

In Figs. 1, 2, and 3, the numeral 5 indicates the hub of the clutch or coupling which is secured in any desirable manner to the driving shaft 6. Secured to the driven shaft 8 is the clutch sleeve 7 which may extend in telescopic relationship and preferably concentric with respect to the hub 5.

The hub 5 is formed with a series of radially extending teeth 9 which should be of substantial wedge shape. Similar teeth 10, generally conforming to teeth 9, are formed in a series of clutch shoes 11. In any event, these cooperating teeth should be constructed so that they provide sufficient clearance to allow retraction of the shoes and also so that there will be no danger of these teeth interlocking in a manner to prevent outward movement of the shoes. As shown, each of these shoes may be of arcuate configuration and preferably six of the same may conveniently be employed to completely encircle the hub. Thus, these shoes are interposed between the hub and the inner face of the sleeve.

Associated with the outer faces of the shoes 11 are layers of friction lining which may be bonded directly to these outer faces. This lining, which has been indicated by the reference numeral 12, is preferably of the metallic type and should have good heat-dissipating characteristics and embody smooth frictional characteristics. As will be obvious to those skilled in the art, numerous materials, now on the market, will satisfactorily encompass these specifications. As will also be obvious, various other methods of treating the surfaces which are to interengage may be employed.

Disposed to each side of the hub member and preferably supported upon the shoulders of the same are clutch control springs 14. These are conveniently formed with inwardly extending fingers or contact portions 15, which project into grooves 16 formed in the side faces of the shoes 11. These grooves, which conveniently parallel the exterior faces of the shoes, are preferably wedge shaped. The spring members are preferably retained in position and subject to adjustment by means of a nut 17 mounted by the hub and bearing against the outermost spring member 18, as well as a snap ring 19 mounted by the hub and disposed adjacent the spring member 14.

A clutch cover 20 may encircle the nut 17 and interposed between the head of the same and the adjacent spring member 18. This cover is retained in position by conveniently employing a lock ring 21. In this connection, it will be noted that the outer edge of the cover may bear against a shoulder forming a part of the clutch sleeve and so that relative movements between these elements will normally be precluded.

Assuming that the parts have been assembled, in the manner illustrated and described, it will be understood that, if the shafts 6 and 8, or their equivalents, are both stationary, the units of the clutch will assume the position shown in Fig. 3. Under these circumstances, a maximum clearance or non-engagement between the outer faces of the shoes and the inner face of the sleeve will exist. As the shaft 6 begins to rotate, centrifugal force acting on the shoes 11 will cause the teeth 9 and 10 to shift with respect to each other and as the shoes move outwardly. It will be apparent, however, that under all conditions relative rotation of the shoes around the hub of the clutch will be precluded.

The outer faces of the shoes will accordingly bear with increasing force against the inner face of the sleeve. As a consequence, an increasing tendency will exist to rotate the sleeve and, dependent upon the rate of rotation of the hub and the resistance to movement of the sleeve, the latter will now begin to rotate. As the speed of rotation of the shaft 6 increases, the centrifugal force acting upon the shoes will increase. This will result in greater intimacy of contact between the outer faces of the shoes (or linings applied to the same) and the inner face of the sleeve. As this intimacy of contact continues to increase, a point will be reached where the sleeve member 7 will, in effect, be coupled against rotation with respect to the hub.

If it is found that this engagement is not sufficiently intimate, the parts of the clutch may be adjusted. Such adjustment may readily be effected by simply turning nut 17 with respect to sleeve 5 and so that the intimacy of contact between this nut and the adjacent spring 18 is relieved. As a consequence of the inwardly extending fingers of the spring members 14 and 18 and the wedge-shaped configuration of the grooves 16, it is apparent that by so adjusting the nut the shoe members may more readily move outwardly under the action of centrifugal force. Consequently, the frictional contact between the outer faces of the shoes 11 and the inner face 13 of the sleeve will be increased. Conversely, if it is found that the coupling action is too pronounced, the operator may adjust the nut 17 with reference to the hub member and so that the intimacy of contact between the nut and the adjacent spring element 18 is increased. This will, of course, result in a thrust being transmitted through the shoe members 11 and to the spring 14 so that the action of the springs will always be equalized. Under these conditions, the fingers 15 of the spring elements will be forced more deeply into the grooves 16. Thus, the action of centrifugal force on the shoes 11 will be increasingly resisted.

Further adjustments of the action of the clutch may readily be effected by simply removing one or more of the shoe members 11. Thus, as illustrated, with one of them removed, the area of contact between these members and the clutch sleeve will be decreased one-sixth. A corresponding decrease will be effected with each removal of an additional shoe. In order to maintain a proper condition of balance, it may be preferred to always remove the pair of shoes which are disposed at diametrically opposite points on the hub member.

This, however, is not material because, as will be observed, the structure permits the removal of, for example, one shoe and a repositioning of the remaining five for centrifugal balance. This is achieved by taking the remaining five and positioning them in the structure as shown, with one tooth separating each shoe. If two shoes are removed, this could be done as above mentioned by removing the pair of shoes disposed at diametrically opposite points on the hub and leaving the remaining shoes as they were initially positioned. However, if desired, the remaining four shoes could be rearranged to be spaced for dynamic balance about the hub, with an alternate spacing between the shoes of first two and then three teeth. Likewise, in the structure as shown, if three shoes are removed, the remaining three can be equally positioned about the hub by having a spacing of five teeth between each of the shoes. It will thus be apparent that this universal positioning of shoes permits the user of the clutch to vary its capacity as desired.

Figure 4:
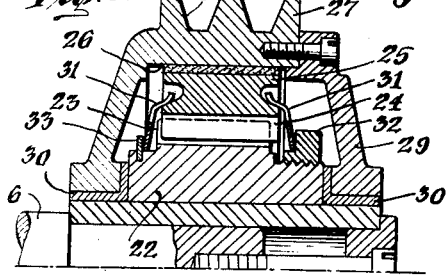
Fig. 4 is a fragmentary view similar to Fig. 1 but showing a slightly different form of construction.

As will be apparent, the teachings of the present invention may be embodied in functionally similar structures of numerous types. Thus, as in Fig. 4, the clutch has been shown as forming a part of a pulley structure. In this view, the numeral 6 again indicates the driving element or shaft to which a hub member 22 is secured in any convenient manner. This member has extending from its edge teeth 23. Shoe members 25 encircle the hub and are provided with inwardly extending teeth 24. The teeth 23 and 24 correspond to the teeth 9 and 10 in the preceding views.

Friction material or any other desired contact surface 26 may be associated with the shoes or otherwise as afore brought out. Encircling the shoes is a pulley member 27 conveniently provided with belt-receiving grooves 28. A cover plate 29 may be secured to the pulley 27. Both of these elements may rotate on bearing material 30 which will allow of free relative rotation between the driving unit or shaft 6 and the pulley. Springs 31, corresponding to springs 14 and 18, may also be provided, and these springs may be retained in proper positions and subject to adjustment by means of the nut 32 and the lock ring 33 which also correspond to the similar parts as heretofore described.

As will be appreciated, clutches constructed in accordance with the teachings of the present invention are free from the objections heretofore encountered in connection with similar units in which the shoes were driven both at the front and at the rear edges and in which a very complicated structure and large number of parts were present. As will be understood in connection with clutches of such type, or where the shoes are driven by the hub adjacent their rear edges, there is caused a definite tendency to "dig in" at the front end of the shoe which tends to destroy the friction material very rapidly. Due to the fact that in my construction the shoes are evenly moved outwardly in a radial direction, it is obvious that proper contact will at all times be assured.

Also, it will be understood that, by the present construction, it is feasible to adjust the parts without it being at all necessary to dismantle the assembly. The springs act to maintain the shoes in proper position with respect to the driving hub. Even if a partial disassembly is resorted to these springs still act as retainers.

As will also be obvious, the present clutch allows of a certain amount of shaft misalignment. In other words, the unit will function somewhat as a flexible coupling.

The centrifugal units will fulfil practically the same functions as other type clutches or couplings as far as connecting and disconnecting driven equipment from a source of power is concerned. Either the centrifugal couplings or the centrifugal clutches can be set by means of the spring control to vary the speed at which the shoes come in contact with the driven drum to start the driving action as the speed of the driver is increasing, as would be the case during acceleration of the driver. The spring control is also effective in reverse in that the shoes are retracted from the driven drum if the speed drops below a certain point, the engagement and disengagement speeds being substantially the same. By means of the spring control, the driving source of power can be allowed to reach any speed up to its maximum before the centrifugal unit engages to drive. Certain types of power sources will be greatly benefited by this provision, for instance; internal combustion engines can be allowed to start and warm up without carrying any load, load not being picked up until the engine is sufficiently accelerated; some types of electric motors will be greatly benefited by this same characteristic of the centrifugal unit spring control. It is also possible to use the spring control so that the couplings or clutches will disconnect automatically if allowed the proper speed reduction, after which the driven machinery can be operated from a second source of power for any length of time while the original source of power remains stationary. The centrifugal units provide excellent resistance against transmission shocks and they also serve as safety devices in that they will not transmit torque beyond their maximum capacity at any one speed and will slip if overloaded. Perhaps one of the best uses of the device is to permit the gradual acceleration of high inertia loads without requiring an extended period of acceleration on the source of driving power. This means that the driver can accelerate to full speed quickly but a heavy load will still remain in the process of acceleration; the time of load acceleration depending upon the capacity and speed of both the source of power and the centrifugal unit used. In any use consistent with the nature of the centrifugal unit, the action of the centrifugal unit itself is completely automatic.

Thus among others, the several objects of the invention as specifically afore noted are achieved. Obviously, numerous changes in construction and rearrangements of the parts might be resorted to without departing from the spirit of the invention as defined by the claims.

I claim:

1. A clutch including in combination a hub, a multiplicity of radially extending equally spaced teeth formed about the circumference of said hub, an annular series of arcuate shoe members disposed around said hub, a multiplicity of inwardly extending equally spaced teeth forming a part of each of said members and cooperative with said hub teeth whereby said shoes may be universally placed about said hub, and a sleeve extending around and adapted to be engaged by said shoe members.

2. A clutch including in combination a hub, a multiplicity of radially extending equally spaced teeth formed about the circumference of said hub, an annular series of arcuate shoe members disposed around said hub, a multiplicity of inwardly extending equally spaced teeth forming a part of each of said members and cooperative with said hub teeth, and a sleeve extending around and adapted to be engaged by said shoe members; said shoe members being removable to decrease the overall contact between the remaining shoe members and said sleeve and said remaining shoes being universally movable about said hub to a condition of centrifugal balance.

3. A clutch including a hub, shoe members arranged around said hub, means for preventing relative rotation of said shoe members and hub, a sleeve encircling said shoe members and adapted to have its inner face engaged by the same in response to centrifugal force acting upon said members, unitary resilient means positioned on each side of and engaging all of said shoes for resisting outward movement of said shoe members towards said sleeve, and a single adjusting means for varying the tension of said resilient means.

4. A clutch comprising a driving member and a driven member, a hub connected to said driving member, said hub provided with a plurality of similarly shaped teeth equally spaced about the circumference thereof, a plurality of shoes interposed and radially movable between said driving member and said driven member, each shoe formed with a plurality of similar wedge shaped, equally spaced teeth for cooperating engagement with said hub teeth whereby universal placement of said shoes may be effected with said shoes always being in engagement with a plurality of teeth on said hub.

5. A clutch comprising a driving member and a driven member, a hub drivingly connected to said driving member, said hub provided with a plurality of similarly shaped teeth equally spaced about the circumference thereof, a plurality of shoes in engagement with said hub and adapted to move radially, a single unitary resilient contact means having a plurality of equally spaced fingers for contacting each side of said shoes whereby the shoes may be universally moved about said hub to any position and always be contacted by a plurality of resilient fingers, and means removable with said hub and in engagement therewith for retaining said resilient means in assembled position thereon whereby said hub, shoes and resilient retaining means may be removed and retained as a unit.

6. A clutch including a hub, shoe members arranged about the circumference of said hub, means for preventing relative rotation of said shoe members and hub while permitting radial movement of said shoes, a sleeve encircling said shoe members and adapted to have its inner face engaged by the said shoe members in response to centrifugal force acting upon said members, resilient means on each side of and in engagement with said shoes for resisting outward movement of said shoe members toward said sleeve and a single means for simultaneously adjusting the tension of said resilient means with respect to all of said shoes.

7. A clutch including a hub, shoe members arranged about the circumference of said hub, means for preventing relative rotation of said shoe members and hub while permitting radial movement, a sleeve encircling said shoe members and adapted to have its inner face engaged by the said shoe members in response to centrifugal force acting upon said members, single unitary resilient means on each side of said shoes for centering said shoes in said hub and for resisting outward movement of said shoe members toward said sleeve and a single means for simultaneously adjusting the tension of said resilient means with respect to all of said shoes.

8. A clutch as provided in claim 7 in which the single adjusting means comprises a nut threaded on said hub and in engagement with a single resilient means.

9. A clutch comprising a driving member and a driven member, a hub connected to said driving member, a multiplicity of similar substantially wedge shaped teeth equally spaced about the entire circumference of said hub, a clutch sleeve encircling and spaced from said hub, shoes disposed between said hub and sleeve, each shoe provided on its inner surface with a plurality of similar substantially wedge shaped, equally spaced teeth for cooperative driving and sliding engagement with said hub teeth, and on its outer side with a surface for frictional engagement with said sleeve and resilient means on each side of said shoes and in engagement therewith for resisting outward movement of said shoes whereby, upon rotation of the driving member, said shoes move radially for substantially equal frictional engagement throughout their outer surface with said sleeve, and whereby said shoes may be universally disposed about said hub teeth permitting removal of one or more shoes and repositioning of the remainder without disturbing the clutch balance.

10. A clutch including a hub portion to be affixed to a driving member, an annular series of radially extending teeth projecting from the periphery of such portion, a plurality of shoes disposed around and adjacent such periphery, a number of teeth forming parts of each of said shoes and extending inwardly of the same to intermesh, throughout an arc of a circular zone, with the hub teeth, and a driven member enclosing and engageable by said shoes.

11. A clutch including a hub portion to be affixed to a driving member, an annular series of radially extending teeth projecting from the periphery of such portion, a plurality of shoes disposed around and adjacent such periphery, a number of teeth forming parts of each of said shoes and extending inwardly of the same to intermesh, throughout an arc of a circular zone, with the hub teeth, a driven member enclosing and engageable by said shoes, and the teeth extending from the hub portion and shoes presenting substantially flat faces and being substantially wedge shaped.

12. A clutch including a hub portion to be affixed to a driving member, an annular series of radially extending teeth projecting from the periphery of such portion, a plurality of shoes disposed around and adjacent such periphery, a number of teeth forming parts of each of said shoes and extending inwardly of the same to intermesh, throughout an arc of a circular zone, with the hub teeth, a driven member enclosing and engageable by said shoes, and means for yieldingly resisting outward movement of said shoes into driving engagement with said driven member.

JOHN M. SCHUCKERS.